Aug. 5, 1941.　　　R. N. SKRAINKA　　　2,251,640
LEVEL ATTACHMENT FOR PENCILS
Filed March 27, 1940　　　2 Sheets-Sheet 1
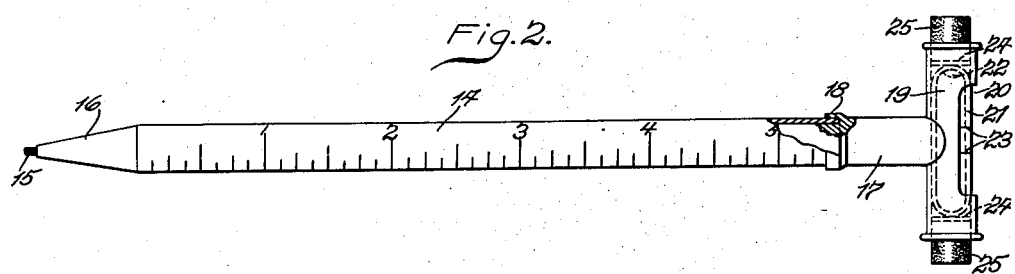
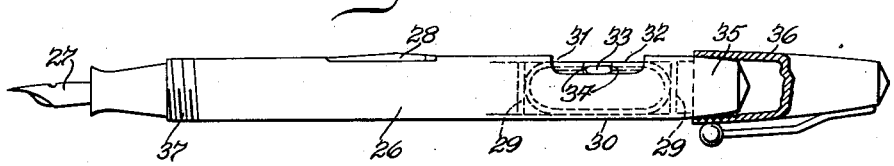
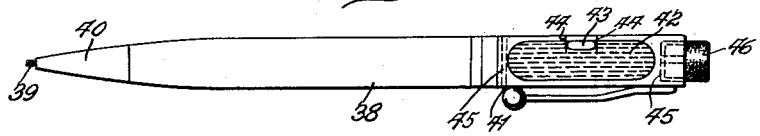
Inventor
Ralph N. Skrainka
by John D. Rippey
His Attorney Aug. 5, 1941.                R. N. SKRAINKA                2,251,640
                       LEVEL ATTACHMENT FOR PENCILS
                  Filed March 27, 1940          2 Sheets-Sheet 2

Inventor
Ralph N. Skrainka
by John D. Rippey
His Attorney

Patented Aug. 5, 1941

2,251,640

UNITED STATES PATENT OFFICE 2,251,640

LEVEL ATTACHMENT FOR PENCILS

Ralph N. Skrainka, University City, Mo.

Application March 27, 1940, Serial No. 326,126

1 Claim. (Cl. 33—207)

This invention relates to level attachments for pencils and the like.

Objects of the invention are to provide a level attachment adapted to be secured to the handle of a pencil or a pen or the like in a manner in which the pencil or pen having the level attached thereto may conveniently be used for its intended purposes or carried in the pocket of the user; to provide a level attachment that may be detachably secured to one end of the pencil or pen as an extension of the handle or secured to the opposite end as an enclosure and guard for the lead or pen point; to provide a level attachment in the form of a tubular member having one end adapted for engagement with the handle of a pen or pencil and the opposite end provided with means for supporting an eraser or the like and a device therebetween for supporting a level; and to provide a combination device in the form of a pencil or pen having thereon graduations adapted to be used as a measuring scale and having in connection therewith an attachment embodying one form of the present invention.

Other objects will be apparent from the following description, reference being made to the annexed drawings, in which—

Fig. 1 is a side elevation showing my improved level attachment in connection with one end of a pencil.

Fig. 2 is a side elevation showing a different embodiment of the invention in connection with a pencil provided with a graduated measuring scale.

Fig. 3 is a side elevation of a pen having means in connection with its body portion and beyond the ink compartment for supporting the level.

Fig. 4 is a side elevation of another form of pencil having the level in connection with the detachable and replaceable end of the pencil handle that is attached to the lead feed mechanism of the pencil.

Figs. 6 and 7 are side elevations showing different embodiments of the invention when made of elastic material and attached to a pencil or the like.

Figure 5:
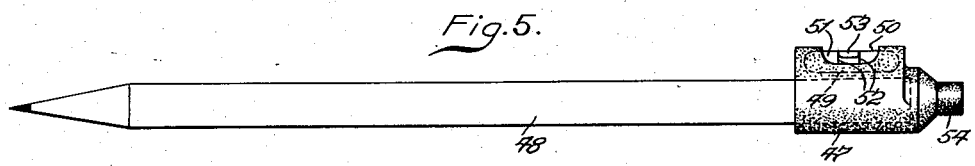
Fig. 5 is a side elevation showing my improved level attachment made of elastic or yielding material and in connection with one end of a pencil.

My improved level attachment, as shown in Fig. 1, comprises a cylinder composed of resilient material and including an end portion 1 having a longitudinal split 2 therein. The portion 1 is adapted to be telescoped on either end of a pencil 3. The part 1 functions as a clamp to hold the level device securely on the pencil so that, when applied as shown in Fig. 1, the level device constitutes an elongation or extension of the pencil and functions as a part of the handle thereof. The device may be withdrawn from the blunt end of the pencil and telescoped onto the opposite or sharp end of the pencil to enclose and to guard and to protect the lead point 4.

An abutment 5 is at the inner end of the clamping portion 1 of the tubular level support beyond the end of the split 2 and is adapted to engage against the blunt end of the pencil 3 or to contact with the end of the lead 4 to limit extent of movement of the tubular device onto and along the pencil.

The outer end portion 6 of the tube encloses a partition or abutment 7 functioning as a stop for a rubber eraser 8 extended into the end portion 6. A relatively long and wide slot 9 is formed in one side of the intermediate portion 10 of the tube between the walls 5 and 7, and a transparent or translucent bulb 11 of glass or other appropriate material is securely clamped within the portion 10 of the tube between and against the walls 5 and 7. If desired, the bulb 11 may be formed with gage lines 12 for cooperation with the liquid content of the bulb so that the vacant space or bubble 13 of the level is precisely located between said lines 12 when the tube device is in an accurate horizontal position.

The remnant of the rubber eraser 8 may be removed when the eraser becomes worn to such an extent that it is no longer capable of satisfactory use, and another eraser substituted therefor. The wall 7 prevents injury to the bulb 11 during insertion of the substitute eraser, and also when no eraser is in connection with the device. Also, the wall 5 protects the opposite end of the bulb 11 from injury by either end of the pencil.

The pencil shown in Fig. 2 is of the refill type and comprises a handle 14 constituting a magazine adapted to contain a number of leads and also to contain a mechanism of known and standard type for operating the lead 15 through and by rotation of the pointed end 16 of the pencil. The tubular part 17 has telescoping connection 18 on and closes the opposite end of the handle 14 and may be removable and replaceable to afford access to the inside of the magazine to insert and remove leads therefrom. The outer end of the tubular part 17 is securely attached to a tube 19 and has in its outer side a relatively long and wide slot 20. A transparent bulb 21 is secured within the tube 19 and contains a quantity of liquid to form a bubble 22. When the bubble 22 is located accurately between the lines 23, it is known that the tube 19 is in a horizontal position. Partitions 24 are attached within the tube 19 considerably beyond the ends of the slot 20 and engage against the ends of the bulb 21 and thereby cooperate with said tube 19 to hold the bulb securely in position therein. Rubber erasers 25 are removably secured within the open ends of the tube 19 beyond the partitions 24.

In this embodiment of the invention, the tube 19 constitutes a handle or lever device for conveniently manipulating the pencil 14 and for operating the usual mechanism for extending or retracting the lead 15.

The device as shown in Fig. 3 is embodied in a fountain pen including a handle and magazine 26 having the pen 27 attached to one end thereof. The operating lever 28 is pivoted to one side of the magazine 26 and is operative to control the usual bag within the magazine 26 in refilling the pen with ink. Two partitions 29 are secured within the tubular magazine 26 and form the end walls of a tubular portion 30. A relatively long and wide slot 31 is formed within one side of the tubular portion 30, and a transparent bulb is mounted within the tubular portion 30 between the walls 29 and contains a quantity of liquid and a bubble or vacant space 33. When the bubble 33 is accurately between the lines 34, it is known that the axis of the pen handle comprising the parts 26 and 30 is horizontal.

An exteriorly threaded extension 35 is adapted to screw into the interiorly threaded end of the removable and replaceable cap 36. The cap 36 may be detached from the extension 35 and screwed onto the threaded portion 37 at the opposite end of the magazine 26 to enclose the pen 27.

The form of the invention shown in Fig. 4 comprises a magazine and handle 38 constituting a magazine for leads and for the usual mechanism operating the lead 29 through and by rotation of the pointed end 40 of the pencil. The tubular part 41 detachably telescopes on the opposite end of the handle 38 and constitutes an extension of said handle and a closure for the magazine. The part 41 encloses a bulb 42 containing a quantity of liquid and a vacant space or bubble 43 which, when appearing accurately between the lines 44, indicates that the axis of the pencil is in a horizontal position. Walls 45 within the part 41 prevent displacement of the bulb 42, and the outer wall 45 constitutes an abutment for the removable and replaceable eraser 46.

The attachment shown in Fig. 5 comprises a socket 47 made of elastic expansible and contractible material adapted to be telescopically engaged on the end of a pencil 48 or other support. One wall of the socket is formed with a cavity 49 and an opening 50. A transparent bulb 51 is seated in the cavity 49 and gripped by the adjacent elastic portions of the body of the socket 47, and is provided with gage lines 52 for cooperation with the liquid content of the bulb so that the vacant space or bubble 53 of the level is precisely located between said lines when the axis of the socket 47 and its support 48 is in an accurate horizontal position. The outer end of the socket 47 is closed by an integral portion 54 of rubber or the like, limiting sliding movement of the socket along the support 48 and which may be used as an eraser if desired and leaving said socket free for turning movements about said support.

Figure 6:
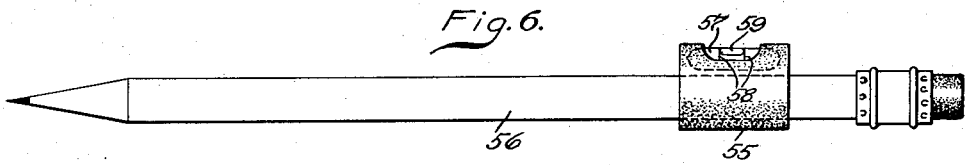

The device shown in Fig. 6 comprises a sleeve 55 of rubber or other elastic material adapted to be mounted for turning movements about and sliding movements to different adjusted positions along a pencil or other support 56. A transparent bulb 57 is embedded in the elastic sleeve 55 and is provided with lines 58 for cooperation with the liquid content of the bulb. When the vacant space or bubble 59 is precisely located between said lines, the axis of the sleeve and of the support 56 is in a horizontal position.

Figure 7:
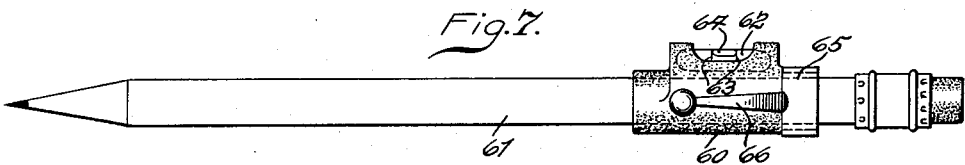

As shown in Fig. 7, the elastic rubber sleeve 60, like the sleeve 55, is mounted for sliding and turning movements on a supporting pencil 61 and embeds a transparent bulb 62 formed with lines 63 for cooperation with the liquid content of the bulb and with the vacant space or bubble 64 when the axis of the sleeve and of the pencil is in a horizontal position. A metallic collar 65 is attached to one end of the sleeve 60 and carries a resilient arm 66 to cooperate with said sleeve as a clamp for holding the device within the pocket or the like. The collar 65 prevents external enlargement of that end portion of the sleeve 60 on which it is mounted and leaves said end portion dilatable to receive the handle.

Figure 8:
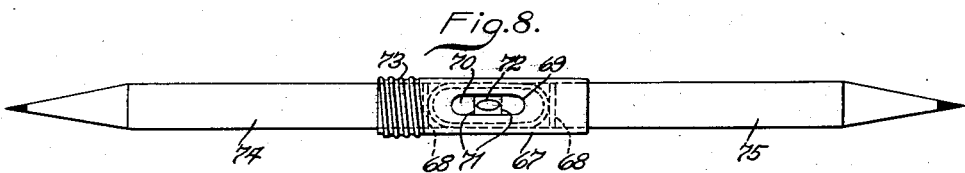
Fig. 8 is a side elevation of another specific form of the invention.

The device shown in Fig. 8 comprises a metallic sleeve 67 enclosing a pair of partitions 68 forming a compartment between them and having a slot 69 between said partitions. A transparent bulb 70 is mounted in the sleeve between the partitions 68 and is provided with lines 71 to cooperate with the liquid content of the bulb so that, when the bubble 72 is precisely between said lines, a horizontal position of the axis of the sleeve is indicated. One end of the sleeve 67 is formed with an internally threaded extension 73 adapted to be screwed onto a support 74, such as a pencil. The opposite end of the sleeve 67 is adapted to be telescoped on another element 75 such as a pencil or an eraser. Pencils, erasers, and the like, may be interchangeably attached to the unthreaded end of the sleeve 67.

In each of the forms of the invention shown, the device constitutes a part of the pencil or pen handle, and may be used for all of its intended purposes quite conveniently.

It is apparent that the invention attains all of its intended objects and purposes and may be manufactured and sold as a utility or distributed as an advertising device.

I claim:

A device of the character described comprising an elongated elastic rubber body having a longitudinal hole therethrough which is open at both ends, said body being expansible and contractible and said hole being adapted to receive selected individual supports of different diameters within the expansible limit of said body and leaving said body free for longitudinal and turning movements on the selected support inwardly beyond the ends of said support, a lateral rubber extension integral with said body having an elongated slot in one side thereof in a direction away from said support, a transparent bulb mounted and clamped in said extension at said slot parallel with and laterally beyond the support that extends through said body, and a quantity of liquid contained in said bulb and forming a bubble visible through said slot in a level position of said support.

RALPH N. SKRAINKA.